United States Patent [19]

Hunter et al.

[11] 4,021,399

[45] May 3, 1977

[54] METHOD FOR THE CONCENTRATION OF WATER-IN-OIL EMULSIONS OF WATER SOLUBLE VINYL ADDITION POLYMERS

[75] Inventors: Wood E. Hunter, Lombard; Barney Vallino, Homewood, both of Ill.

[73] Assignee: Nalco Chemical Company, Oak Brook, Ill.

[22] Filed: Mar. 12, 1976

[21] Appl. No.: 666,361

[52] U.S. Cl. .................. 260/29.6 H; 260/29.6 HN; 260/29.6 WQ; 260/29.6 MH; 260/29.6 PT

[51] Int. Cl.² .................. C08L 33/02; C08L 33/26; C08L 57/12

[58] Field of Search .............. 260/29.6 H, 29.6 HN, 260/29.6 WQ, 29.6 PT

[56] References Cited

UNITED STATES PATENTS

| | | | |
|---|---|---|---|
| 3,284,393 | 11/1966 | Vanderhoff et al. | 260/29.6 |
| 3,624,019 | 11/1971 | Anderson et al. | 260/29.6 H |
| 3,734,873 | 5/1973 | Anderson et al. | 260/29.6 H |
| 3,790,476 | 2/1974 | Spoerle et al. | 210/47 |
| 3,790,477 | 2/1974 | Nielsen et al. | 210/47 |
| 3,826,771 | 7/1974 | Anderson et al. | 260/29.6 H |
| 3,867,321 | 2/1975 | Riew | 260/17.45 T |

*Primary Examiner*—Harold D. Anderson
*Assistant Examiner*—E. A. Nielsen
*Attorney, Agent, or Firm*—John G. Premo; Robert A. Miller; Barry W. Sufrin

[57] ABSTRACT

A method for the concentration of water-in-oil emulsions of water soluble vinyl addition polymers is disclosed. The process involves distilling the water-in-oil emulsion of the water soluble vinyl addition polymer under a vacuum while maintaining the water-oil phase ratio substantially equal to the starting latex. Maintaining this ratio allows latices of this type to be concentrated to as high as 70% by weight polymer.

4 Claims, No Drawings

METHOD FOR THE CONCENTRATION OF WATER-IN-OIL EMULSIONS OF WATER SOLUBLE VINYL ADDITION POLYMERS

Water-in-oil emulsions of water soluble vinyl addition polymers have become increasingly important in the art. Evidence of this is found in U.S. Pat. No. 3,624,019; U.S. Pat. No. 3,826,771; U.S. Pat. No. 3,790,477 all of which are hereinafter incorporated, by reference into this application. There is now evidence that when these water soluble vinyl addition polymers are made in emulsion form they may exhibit activity if manufactured in a lower concentration (i.e., 30 weight percent rather than 35 or 40 weight percent).

Attempts have been made to boost the activity of polymers of this type without great success and it would therefore be an advancement to the art if water-in-oil emulsions of water soluble vinyl addition polymers could be concentrated so as to maintain their stability while making them more economical to ship and store. We have now found that these latex polymers can be concentrated by distilling them so as to recover volumes of water and of inert hydrophobic liquid phase such as to keep the oil/water ratio substantially equal to that of the starting latex.

OBJECTS

It is, therefore, the object of our invention to provide to the art a method for the concentration of latex polymers by distillation, especially by removing equal volumes of water and hydrophobic liquid from them.

Other objects will appear hereinafter.

THE INVENTION

As previously stated, the process of our invention deals with the concentration of water-in-oil emulsions of water soluble vinyl addition polymers. Generally, the steps we use to practice our invention comprise:

A. Heating a water-in-oil emulsion of a water soluble vinyl addition polymer to a temperature of from 40° – 90° C with agitation while maintaining a vacuum, said water-in-oil emulsion of a water soluble vinyl addition polymer comprising:
  1. From 30 – 95% by weight of an aqueous phase consisting of polymer and water;
  2. From 10 – 40% by weight polymer;
  3. From 5 – 70% by weight of an inert hydrophobic liquid; and,
  4. From 1.0 – 21.0% by weight of a water-in-oil emulsifying agent;
B. Removing by distillation from the water-in-oil emulsion a mixture of water and inert hydrophobic liquid;
C. Maintaining the weight phase ratio of water and inert hydrophobic liquid present in the water-in-oil emulsion at substantially an equal level by returning to the water-in-oil emulsion excess water or hydrophobic liquid distilled;
D. Continuing steps A, B and C above until the water-in-oil emulsion contains from 40 – 60% by weight polymer; and then,
E. Recovering a concentrated water-in-oil emulsion of a water soluble vinyl addition polymer.

THE WATER-IN-OIL EMULSION OF WATER SOLUBLE VINYL ADDITION POLYMERS

The water-in-oil emulsions of water soluble vinyl addition polymers useful in this invention are stable, yet at the same time contain relatively large amounts of polymer. The polymers dispersed in the emulsions are quite stable when the particle size of the polymer is in the range of 2 millimicrons up to about 5 microns. The preferred particle size is within the range of 5 millimicrons and 3 microns.

The stable water-in-oil emulsion comprises: 1. an aqueous phase; 2. a hydrophobic liquid; and 3. a water-in-oil emulsion emulsifying agent.

The polymer containing emulsion of this invention is comprised of an aqueous phase ranging from between 30 and 95 percent by weight of the emulsion. The aqueous phase is defined as the sum of the polymer or copolymer and the water present in the composition. The preferred range is between 70 and 90 percent by weight of the emulsion. The most preferred range is between 70 and 80 percent by weight of the emulsion.

The polymer concentration of the emulsion ranges between 10 – 50 percent by weight. A preferred range is between 25 and 40 percent by weight of the emulsion. The most preferred range is between 25 and 35 percent by weight of the emulsion.

As seen, based on the weight of the aqueous phase and the percent polymer contained in the aqueous phase, the polymer containing emulsion may contain from 25 – 85% by weight water.

For the purposes of this invention, the term, water soluble vinyl addition polymer, includes acrylamide homopolymers and co-polymers which contain at least 20 percent and preferably 75 percent by weight of acrylamide. The acrylamide polymers most commonly used in the practice of this invention include polyacrylamide and its water-soluble copolymers prepared by polymerizing acrylamide with monomers such as for instance, acrylic acid, methylacrylic acid, itaconic acid, acrylonitrile, dimethylaminomethylmethacrylate. An acrylamide polymer also useful in the practice of this invention is hydrolyzed polyacrylamide which has from 1 – 50 percent of the original carboxamide groups hydrolyzed to carboxyl groups.

Also contemplated within the terms of this invention are other water soluble vinyl addition polymers such as those prepared from dimethyl diallyl ammonium chloride, and those prepared from dimethylaminoethylmethacrylate. It is also to be understood that within the context of this invention any water-in-oil emulsion of a water soluble vinyl addition polymer said vinyl addition polymer being soluble in water, may be concentrated according to the terms of this disclosure.

The molecular weight of the acrylamide polymers described above may vary over a wide range, e.g. 10,000 to 25 million. The preferred water soluble vinyl addition polymer has a molecular weight in excess of one million.

The organic or oil phase of the emulsion is comprised of an inert hydrophobic liquid. The hydrophobic liquid comprises between 5 and 70 percent by weight of the emulsion. The preferred range is between 5 and 40 percent by weight of the emulsion. The most preferred range is between 20 and 30 percent by weight of the emulsion.

The oils used in preparing these emulsions may be selected from a large group of organic liquids which include liquid hydrocarbons and substituted liquid hydrocarbons. A preferred group of organic liquids are aliphatic hydrocarbon liquids which include blends of aromatic and aliphatic hydrocarbon compounds, which contain from 4 to 8 carbon atoms. Thus, such organic hydrocarbon liquids as benzene, xylene, toluene, mineral oils, kerosenes, naphtha and in certain instances, petroleum, may be used. A particularly useful oil from the standpoint of its physical and chemical properties is the branch-chain isoparaffinic solvent sold by Humble Oil and Refinery Company under the trade name "Isopar M". Typical specifications of this narrow-cut isoparaffinic solvent are set forth below in TABLE I.

TABLE I

| Specification Properties | Minimum | Maximum | Test Method |
|---|---|---|---|
| Gravity, API at 60/60° F. | 48.0 | 51.0 | ASTM D 287 |
| Color, Saybolt | 30 | — | ASTM D 156 |
| Aniline point, ° F. | 185 | — | ASTM D 611 |
| Sulfur, ppm | — | 10 | ASTM D 1266 (Nephelometric mod.) |
| Distillation, ° F. | | | |
| IBP | 400 | 410 | |
| Dry point | — | 495 | |
| Flash point, ° F. (Pensky-Martens closed cup) | 160 | — | ASTM D 93 |

Any conventional water-in-oil emulsifying agent can be used such as sorbitan monostearate, sorbitan monooleate, and the so called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is present in amounts ranging between 0.1 and 21.0% by weight of the emulsion. The preferred range is between 1.0 and 15.0% by weight of emulsion. The most preferred range is between 1.2 and 10% by weight of the emulsion.

The polymers contemplated for use in this invention may be synthesized in emulsion form as described in Vanderhoff et al, U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al, U.S. Pat. No. 3,624,019 and U.S. Pat. No. 3,734,873, both of which are hereby incorporated by reference.

The water-in-oil emulsion used in the practice of this invention exhibits the unique ability of rapidly dissolving into aqueous solution. The polymer-containing emulsion releases the polymer in water in the presence of a surfactant in a very short peroid of time. This invention technique is described in Anderson et al, U.S. Pat. No. 3,624,019 and U.S. Pat. No. 3,734,873.

THE PROCESS

The water-in-oil emulsions of this invention are concentrated by heating them at temperatures of from 30° to 100° C with agitation. Preferably, the water-in-oil emulsions of this invention are concentrated at temperatures of from 40° – 90° C with agitation. Most preferably, temperatures used for the concentration of the water-in-oil emulsions of this invention range from 40° to 70° C. Since the preferred temperatures are often less than the boiling point of the water or oil, the distillation is often carried out under vacuum. When using reduced pressure or vacuum, which is a preferred element of this invention, the vacuum should be sufficient to cause material to distill at temperatures low enough whereby latex stability is not endangered.

During the distillation step, it has been found that often times the water and inert hydrophobic liquid used in making the emulsion will distill together or come off as an azeotrope.

It is important within the terms and conditions of this invention that the amounts of the aqueous phase and of the hydrophobic oil phase removed from water-in-oil emulsion, leave the emulsion with a substantially equal weight phase ratio to that started with. As an example, if the oil/water ratio if 0.63 after concentration, by the terms of this invention, the oil/water phase ratio should be approximately 0.63. Often times, the phase ratio can vary and latex stability can still be achieved. It is thus within the terms of this invention that the oil/water phase ratio of the concentration water-in-oil emulsion of a water soluble vinyl addition polymer can vary −0.1 unit to +0.6 units of oil/water ratio of the starting water-in-oil emulsion. Preferably, the oil/water ratio will vary −0.05 units to +0.4 units and most preferably the oil/water ratio will be 0 to 0.4 units higher than the starting ratio. When talking about the oil/water ratio, it is to be understood that this is the amount of hydrophobic oil divided by the amount of water present in the emulsion i.e., a weight oil/water ratio.

During the distillation step it is important within the terms and conditions of our invention that if excess water comes off the emulsion, it be returned to the oil-in-water emulsion so as to keep this phase ratio substantially constant. Likewise, if more hydrophobic oil phase is removed, it should be returned in a volume sufficient to keep the phase ratio at a substantially equal level to the starting water-in-oil emulsion.

The distillation step may continue until the emulsion reaches a viscosity which will be the maximum suitable for handling or until only 25% of the original hydrophobic phase remains (75% removed). This is due to the fact that removal of more of the hydrophobic phase may tend to cause instability of the concentrated latex. It should be noted, however, that it is possible to remove 90% of the resultant hydrophobic phase and still maintain latex stability on occasion.

Generally, the latex may be concentrated to from 40 to 70% by weight polymer and preferably to 40 60%. Most preferably, the latex is concentrated to a polymer concentration of from 40 to 50% by weight.

In order to further illustrate our invention, the following examples are presented:

| ACRYLAMIDE-ACRYLIC ACID EMULSION RECIPE | |
|---|---|
| ISOPAR M | 25.74 |
| Sorbitan Monostearate | 1.35 |
| Water | 36.05 |
| Acrylamide | 19.08 |
| Acrylic Acid | 8.1 |
| Sodium Hydroxide (50%) | 9.0 |
| 2,2'-azobis(isobutyronitrile) | 0.3 |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'-azobis(isobutyronitrile) dissolved in toluene was added to the mixture. The emulsion was heated to about 60° C. with agitation. The reaction proceeded for 2½ hours at which time it has reached completion. The resulting product was a stable emulsion, the properties of which can be found in Table II.

EXAMPLE II

To a one-liter resin flask equipped with a condenser which was, in turn fitted with a Barrett moisture receiver with a 3-way stop cock to allow water and oil to return to the flask, agitator, thermometer and stopper, was charged 500 grams of the water-in-oil emulsion polymer prepared in Example I. A vacuum of 250 millimeters of Hg was applied and with agitation the emulsion was heated to 74° where distillation began. The distillation was continued for a total of 5 hours and a total of 100 grams of water and 75 grams of Isopar were removed. The final oil to water ratio was 0.60 as compared to 0.65 for the starting latex and the resulting concentrated polymer latex was stable and contained 48.0% polymer. Other properties are found on Table II.

EXAMPLES III THROUGH VII

The procedure of Example II was generally followed with minor variation using the water-in-oil emulsion prepared in Example I. Results obtained by taking off varying amounts of oil/water are shown in Table II. It is especially interesting to note that the stability of the latex as determined by centrifuging a sample and then determining the "% unpourable" after $x$ minutes of centrifugation decreases significantly as the oil and water ratio is varied from that of the starting latex polymer.

an emulsion prepared containing 45.0% polymer (without the concentration of my invention) which exhibited significantly less activity than either Examples I or II and yet contained the same monomer charge, and, was of approximately the same molecular weight.

We claim:
1. A process for the concentration of water-in-oil emulsions of water-soluble vinyl addition polymers which comprises the steps of:
   A. Heating a water-in-oil emulsion of a water-soluble vinyl addition polymer to a temperature of from 40° –90° with agitation while maintaining a vacuum, said water-in-oil emulsion of a water-soluble vinyl addition polymer comprising:
      1. From 30 – 95% by weight of an aqueous phase consisting of polymer and water;
      2. From 10 – 40% by weight polymer;
      3. From 5 - 70% by weight of an inert hydrophobic liquid; and,
      4. From 0.1 – 21.0% by weight of a water-in-oil emulsifying agent;
   B. Removing by distillation from the water-in-oil emulsion a mixture of water and inert hydrophobic liquid;
   C. Maintaining the weight phase ratio of water and inert hydrophobic liquid present in the water-in-oil emulsion at substantially an equal level by returning to the water-in-oil emulsion excess water or hydrophobic liquid distilled;
   D. Continuing steps A, B and C above until the water-in-oil emulsion contains from 40 – 60% by weight polymer; and then,
   E. Recovering a concentrated water-in-oil emulsion of a water-soluble vinyl addition polymer.
2. The process of claim 1 wherein the oil/water phase ratio of the concentrated water-in-oil emulsion of a water-soluble vinyl polymer is −0.1 to +0.6 units from the oil/water ratio of the starting water-in-oil emulsion.
3. The process of claim 1 wherein the water-soluble vinyl addition polymer is an acrylamide polymer.
4. The process of claim 1 wherein the distillation is conducted at a reduced pressure.

TABLE II

| Ex. | Starting Material | % Solids | Temp. | Vacuum | Time | Charge Wt. | $H_2O$ Off | Oil Off | Oil/$H_2O$ Final | % Solids | Stability (at time - min.) | | | | | n |
|---|---|---|---|---|---|---|---|---|---|---|---|---|---|---|---|---|
| | | | | | | | | | | | 10 | 30 | 60 | 120 | 180 | |
| | | | | | | | | | | | % Unpourable | | | | | |
| 1 | — | 30.7 | — | — | — | — | — | — | 0.65 | 30.7 | 3 | 12 | 20 | 27 | 29 | 18.7 |
| 2 | Ex. 1 | 30.7 | 74° C | 250 mm | 5 hrs. | 500 gm | 100 gm | 75 gm | 0.60 | 48.0 | 1 | 5 | 12.5 | 21 | 25 | 16.6 |
| 3 | Ex. 1 | 30.7 | 70° C | 250 mm | 4½ hr | 500 gm | 45 gm | 45 gm | 0.55 | 43.4 | 1 | 8 | 16 | 24 | 28 | |
| 4 | Ex. 1 | 30.7 | 70–80° C | 250 mm | 2½ hr | 500 gm | 99 gm | 26 gm | 0.88 | 47.0 | 13 | 28 | 35 | 40 | 62 | |
| 5 | Ex. 1 | 30.7 | 70° C | 230 mm | 1½ hr | 500 gm | 51.6 gm | 0 | 0.85 | 39.9 | 13 | 26 | 34 | 39 | 41 | |
| 6 | Ex. 1 | 30.7 | 90° C | atmos | 1½ hr | 375 gm | 39.7 gm | 0 | 1.00 | 39.6 | 15 | 29 | 36 | 41 | 43 | |
| 7 | Ex. 1 | 30.7 | 80° C | 250 mm | 1½ hr | 365 gm | 80 gm | 0 | 1.21 | 47.8 | 31 | 40 | 40 | 40 | 40 | |

EXAMPLE VIII

The material of Examples I and II were tested in the clarification of water containing finely dispersed particles of Kaolin. It was found that both emulsions gave equivalent high activities. This would be in contrast to

* * * * *

UNITED STATES PATENT AND TRADEMARK OFFICE
CERTIFICATE OF CORRECTION

PATENT NO. : 4,021,399

DATED : May 3, 1977

INVENTOR(S) : Wood E. Hunter, et al

It is certified that error appears in the above-identified patent and that said Letters Patent are hereby corrected as shown below:

Column 6, Line 12 of Claim 1.

Letters Patent should read as:

"90°" --- 90° C

Signed and Sealed this ninth Day of August 1977

[SEAL]

Attest:

RUTH C. MASON
Attesting Officer

C. MARSHALL DANN
Commissioner of Patents and Trademarks